United States Patent
Kojima

(10) Patent No.: US 9,809,227 B2
(45) Date of Patent: Nov. 7, 2017

(54) APPARATUS AND METHOD FOR IDENTIFYING TARGET OBJECT

(71) Applicant: DENSO CORPORATION, Kariya, Aichi-pref. (JP)

(72) Inventor: Shinya Kojima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/923,155

(22) Filed: Oct. 26, 2015

(65) Prior Publication Data

US 2016/0114804 A1  Apr. 28, 2016

(30) Foreign Application Priority Data

Oct. 27, 2014  (JP) .................................. 2014-218582

(51) Int. Cl.
| | |
|---|---|
| *B60W 40/02* | (2006.01) |
| *G01S 17/02* | (2006.01) |
| *G01S 17/93* | (2006.01) |
| *G01S 17/42* | (2006.01) |
| *G01S 7/48* | (2006.01) |

(52) U.S. Cl.
CPC ........... *B60W 40/02* (2013.01); *G01S 7/4808* (2013.01); *G01S 17/023* (2013.01); *G01S 17/42* (2013.01); *G01S 17/936* (2013.01); *B60W 2550/10* (2013.01)

(58) Field of Classification Search
CPC ... B60W 40/02; B60W 2550/10; G01S 17/42; G01S 7/4808; G01S 17/023; G01S 17/936
See application file for complete search history.

(56) References Cited

U.S. PATENT DOCUMENTS

2014/0180497 A1  6/2014  Kojima

FOREIGN PATENT DOCUMENTS

JP  2009-070344 A  4/2009

OTHER PUBLICATIONS

Hiroaki et al. JP2009-070344 (see attached machine translation into English provided by EPO).*

* cited by examiner

*Primary Examiner* — Mussa A Shaawat
*Assistant Examiner* — Michael Kerrigan
(74) *Attorney, Agent, or Firm* — Knobbe, Martens, Olson & Bear, LLP

(57) ABSTRACT

In an apparatus, a storage stores therein first identification data prepared for each of target objects including a specified target object and second identification data prepared for each of the target objects. The first identification data for each of the target objects is determined based on a first feature pattern of a corresponding one of the target objects. The second identification data for each of the target objects is determined based on a second feature pattern indicative of a surrounding environment around a corresponding one of the target objects. An identifier obtains a degree of similarity of the feature of the candidate data with respect to the specified target object according to the first identification data and the second identification data prepared for the specified target object. The identifier identifies, according to the obtained degree of similarity, whether the specified target object is in the environmental data.

18 Claims, 8 Drawing Sheets

APPARATUS AND METHOD FOR IDENTIFYING TARGET OBJECT

CROSS REFERENCE TO RELATED APPLICATION

This application is based on and claims the benefit of priority from Japanese Patent Application No. 2014-218582, filed on Oct. 27, 2014, which is incorporated in its entirety herein by reference.

TECHNICAL FIELD

The present disclosure relates to technologies for identifying target objects located around a vehicle.

BACKGROUND

A known technology for motor vehicles obtains environmental data indicative of environmental situations of a vehicle; the environmental data is output from one or more sensing devices including a camera and a laser radar. Then, the known technology identifies specified target objects located around the vehicle using the environmental data. Japanese Patent Application Publication No. 2009-70344 is one typical example of disclosing such a technology.

For example, the known technology has pre-prepared dictionary data including feature quantities of target objects to be identified, and compares the environmental data with the dictionary data. Then, the known technology extracts data from the environmental data; the extracted data has a higher similarity to the feature quantities of a target object. This identifies the extracted data from the environmental data as the data of the target object.

SUMMARY

If the environmental data includes data representing a part of a non-target object, which has a higher similarity to the feature quantities of a target object, the known technology may erroneously extract the data, which represents a part of non-target objet, from the environmental data as data of the target object. This may reduce the accuracy of identifying target objects using the environmental data.

In view of the circumstances set forth above, one aspect of the present disclosure seeks to provide apparatuses and methods for identifying a target object with a higher accuracy.

A first exemplary aspect of the present disclosure provides an apparatus or a method for identifying a target object. The apparatus or method includes a unit or step for obtaining environmental data indicative of features of an environmental situation of a vehicle. The apparatus or method includes a unit or a step for extracting, from the environmental data, candidate data estimated to include a specified target object and an environmental situation of the specified target object. The candidate data includes a feature in the features of the environmental situation. The apparatus includes a storage that stores therein first feature patterns of each of a plurality of target objects including the specified target object, and second feature patterns of surrounding environments of each of the plurality of target objects. The apparatus or method includes a unit or a step for (1) Calculating degrees of similarity of the feature of the candidate data with respect to each of the first and second feature patterns stored in the storage (2) Identifying, according to the calculated degrees of similarity, the specified target object in the environmental data.

A second exemplary aspect of the present disclosure provides an apparatus or method for identifying a target object. The apparatus or method includes a unit or a step for obtaining environmental data indicative of features of an environmental situation of a vehicle. The apparatus or method includes a unit or a step for extracting, from the environmental data, candidate situation data estimated to include a specified target object and an environmental situation of the specified target object, and candidate target-object data estimated as the specified target object. The candidate target-object data includes a first feature in the features of the environmental situation, and the candidate situation data includes a second feature in the feature of the candidate data. The apparatus includes a storage that stores therein first feature patterns of each of a plurality of target objects including the specified target object, and second feature patterns of surrounding environments of each of the plurality of target objects. The apparatus or method includes a unit or a step for (1) Calculating first degrees of similarity of the first feature of the candidate target-object data with respect to the first feature patterns (2) Calculating second degrees of similarity of the second feature of the candidate situation data with respect to the second feature patterns (3) Identifying, according to the calculated first degrees of similarity and second degrees of similarity, the specified target object in the environmental data.

A third exemplary aspect of the present disclosure provides an apparatus or a method for identifying a target object. The apparatus or method includes a unit or a step for obtaining environmental data indicative of features of an environmental situation of a vehicle. The apparatus or method includes a unit or a step for extracting, from the environmental data, candidate target-object data estimated as a specified target object, and candidate situation data having a predetermined location in the environmental data separated from the specified target object. The candidate target-object data includes a first feature in the features of the environmental situation, and the candidate situation data includes a second feature in the feature of the candidate data. The apparatus includes a storage that stores therein first feature patterns of each of a plurality of target objects including the specified target object, and second feature patterns of at least the predetermined location of the candidate situation data. The apparatus or method includes a unit or a step for (1) Calculating first degrees of similarity of the first feature of the candidate target-object data with respect to the first feature patterns (2) Calculating second degrees of similarity of the second feature of the candidate situation data with respect to the second feature patterns (3) Identifying, according to the calculated first degrees of similarity and second degrees of similarity, the specified target object in the environmental data.

A fourth exemplary aspect of the present disclosure provides a drive assist system including an apparatus selected from one of the apparatus according to the first exemplary aspect, the apparatus according to the second exemplary aspect, and the apparatus according to the third exemplary aspect. The drive assist system includes a drive assist apparatus that performs one of a first drive assist task and a second drive assist task. The first drive assist task is configured to avoid a collision of the vehicle with the identified specified target object. The second drive assist task is configured to reduce injuries due to the collision of the vehicle with the identified specified target object.

A fifth exemplary aspect of the present disclosure provides a vehicle including an apparatus selected from one of the apparatus according to the first exemplary aspect, the apparatus according to the second exemplary aspect, and the apparatus according to the third exemplary aspect. The vehicle includes at least one target device installed therein, and a drive assist apparatus that performs one of a first drive assist task and a second drive assist task. The first drive assist task is configured to cause the at least one target device to avoid a collision of the vehicle with the identified specified target object. The second drive assist task is configured to cause the at least one target device to reduce injuries due to the collision of the vehicle with the identified specified target object.

Each of the first to fifth exemplary aspects of the present disclosure enables the specified target object to be efficiently identified based on the feature patterns of the surrounding environments of each of the plurality of target objects including the specified target object. This is because the feature patterns of the surrounding environments of each of the plurality of target objects including the specified target object enable a non-specified target object, which has little association with the surrounding environments of the specified target object, to be efficiently eliminated.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
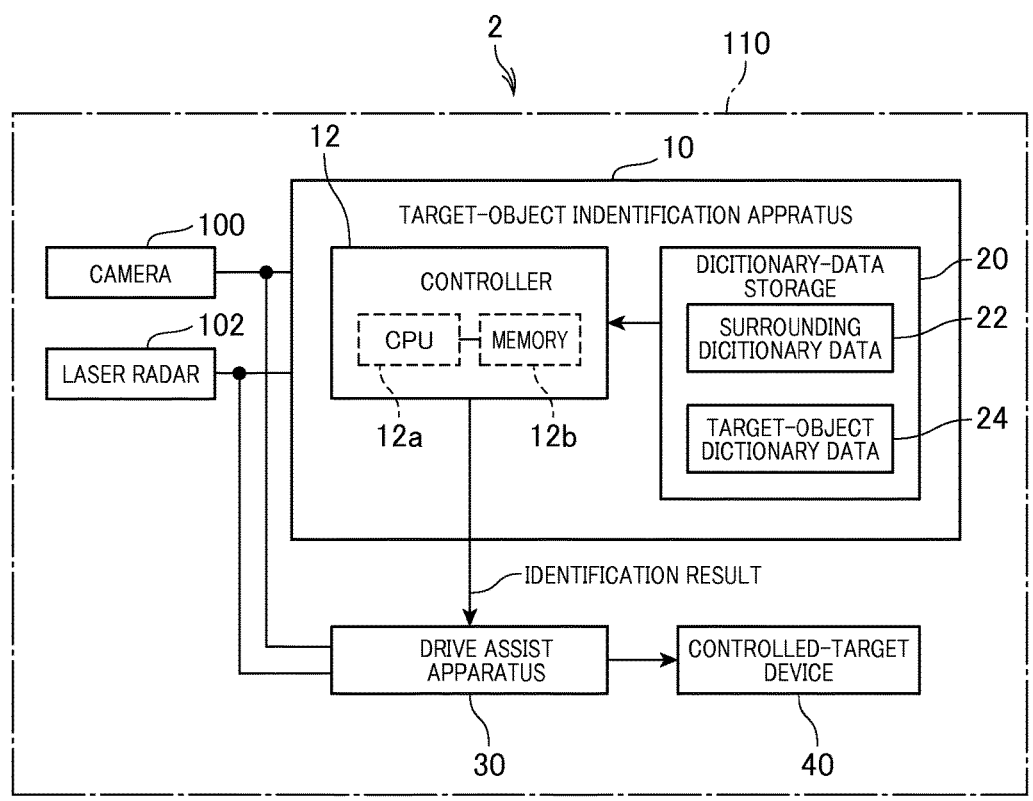
FIG. 1 is a block diagram schematically illustrating an example of the overall structure of a drive assist system installed in a vehicle according to the first embodiment of the present disclosure.

The following describes specific embodiments of the present disclosure hereinafter with reference to the accompanying drawings. In the embodiments, descriptions of like parts between the embodiments, to which like reference characters are assigned, are omitted or simplified to avoid redundant description.

First Embodiment

A drive assist system 2, which incorporates therein an apparatus for identifying a target object according to the first embodiment, is installed in a motor vehicle, such as a passenger vehicle, 110. The drive assist system 2 has, for example, functions of assisting a driver's driving of the vehicle 110.

Referring to FIG. 1, the drive assist system 2 includes a target-object identification apparatus 10, a drive assist apparatus 30, a camera 100, and a beam sensor 102. The target-object identification apparatus 10 includes a controller 12 and a dictionary-data storage 20.

Figure 2:
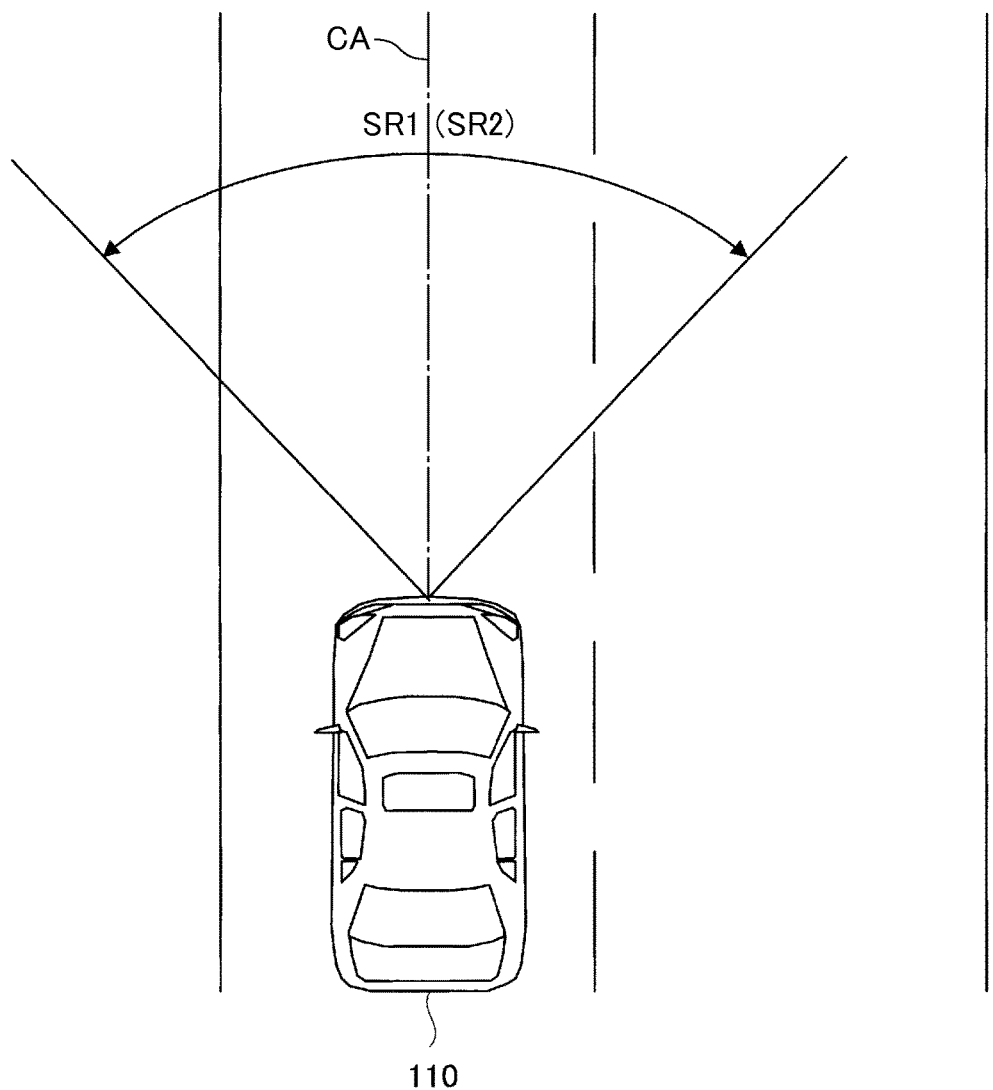
FIG. 2 is a view schematically illustrating a first sensing region of a camera1 illustrated in FIG. 1 and a second sensing region of a laser radar illustrated in FIG. 1.

The camera 100 is attached to, for example, the center of the front of the vehicle 110. Referring to FIG. 2, the camera 100 has, as its first sensing region SR1, a sector region in a horizontal direction, i.e. the width direction of the vehicle 110 ahead of the vehicle 110. Specifically, the first sensing region SR1 has a symmetric shape relative to the optical axis, i.e. a center axis OA, extends toward the front side of the vehicle 110, and has a predetermined vertical width in the height direction of the vehicle 110.

Specifically, the camera 100 is operative to cyclically pick up images, i.e. frame images, of the first sensor region SR1, and successively send the picked-up images as first environmental data around the vehicle 110, to each of the target-object identification apparatus 10 and the drive assist apparatus 30.

The beam sensor 102 is attached to, for example, the center of the front of the vehicle 110, and is operative to transmit probing beams, such as millimeter waves or laser waves toward the front of the vehicle 110. This scans a second sensing region SR2, i.e. sector region, in a horizontal direction, i.e. the width direction of the vehicle 110 ahead of the vehicle 110. The beam sensor 102 receives echoes based on reflection of at least one of the probing beams by objects located in the second sensing region SR2; each echo has a corresponding scan angle with respect to a center axis OA within the second scanning region SR2. Based on the received echoes, the bean sensor 102 is operative to detect the distances of objects, located ahead of the vehicle 110 in the second sensing region SR2, relative to the vehicle 110, and detect the orientations of the vehicle 110 relative to the vehicle 110. The beam sensor 102 is operative to output, as second environmental data around the vehicle 110, the detected distances and orientations of the objects to each of the target-object identification apparatus 10 and the drive assist apparatus 30. For example, the first sensing region SR1 by the camera 100 of the first embodiment matches with the second sensing region SR2 by the beam sensor 102 for the sake of simply descriptions.

The controller 12 is mainly comprised of a well-known microcomputer consisting of, for example, a CPU 12a and a memory 12b including at least one of a ROM and a RAM; the CPU 12a and memory 12b are communicably connected to each other. In particular, the memory 12b includes a non-volatile memory that does not need power to retain data.

The CPU 12a performs various routines, i.e. various sets of instructions, including a target-object identification routine, stored in the memory 12b. For example, the CPU 12a performs the target-object identification routine, thus identifying other vehicles, pedestrians, traffic signs, guardrails, and other traffic objects located around the vehicle 110 as target objects.

The dictionary-data storage 20 includes, for example, a ROM or a database. The dictionary-data storage 20 stores individually surrounding dictionary data 22 and target-object dictionary data 24.

The surrounding dictionary data 22 includes both first identification data and second identification data prepared for each of the target objects. The first identification data for each of the target objects is based on a first feature pattern, i.e. a target-object feature quantity pattern, of a corresponding one of the target objects.

The second identification data for each of the target objects is based on a second feature pattern, i.e. an estimated environmental feature quantity pattern, around a corresponding one of the target objects.

The target-object dictionary data 24 includes the first identification data prepared for each of the target objects set forth above.

For example, the first identification data and the second identification data of the surrounding dictionary data 22 are designed as, for example, the set of a plurality of connected classifiers. In this example, the first identification data has been trained based on the target-object feature quantity pattern, i.e. the set of target-object feature quantities, as a supervised quantity pattern for each of the target objects in one of the known training methods. This enables the surrounding dictionary data 22 to reliably identify whether an unknown feature quantity, which is input to the surrounding dictionary data 22, matches with environmental situations, i.e. surroundings, of any one of the target objects or fails to match with environmental situations, i.e. surroundings, of any one of the target objects.

Similarly, the second identification data has been trained based on the estimated environmental feature-quantity pattern, i.e. the set of estimated environmental feature quantities, as a supervised quantity pattern for each of the target objects in one of the known training methods. This enables the surrounding data 22 to reliably identify whether an unknown feature quantity, which is input to the surrounding dictionary data 22, matches with an estimated environment around any one of the target objects or fails to match with an estimated environment around any one of the target objects.

As another example, the first identification data and the second identification data of the surrounding dictionary data 22 are designed as a database. Specifically, the database includes the first identification data comprised of the target-object feature quantity patterns for the respective target objects, and includes the second identification data composed of the estimated environmental feature-quantity patterns for the respective target objects.

Similarly, the first identification data of the target-object dictionary data 24 is designed as the set of a plurality of connected classifiers or a database like the surrounding dictionary data 22.

Note that the estimated surrounding environments around a target object include estimated backgrounds around the target object, such as a road surface, structural objects, and the sky, around the target object.

The first embodiment can use the patterns of histograms of oriented gradients (HOG) as both the target-object feature quantity pattern for each of the target objects, and the environmental feature quantity pattern around a corresponding one of the target objects. For example, the HOG represents the histogram of oriented gradients of pixel values in the pixels of a predetermined local detection cell in each of the digital frame images. In other words, each of the images picked-up by the camera 100 has a specific feature, such as the histogram of oriented gradients and the histogram of pixel values.

The drive assist apparatus 30 is mainly comprised of a well-known microcomputer consisting of, for example, a CPU and a memory including at least one of a ROM and a RAM, which are communicably connected to each other. In particular, the memory includes a non-volatile memory that does not need power to retain data.

The CPU of the drive assist apparatus 30 performs various routines, i.e. various sets of instructions, including at least one of drive assist routine, stored in the memory according to the one or more target objects identified by the target-object identification apparatus 10. For example, the drive assist routines control controlled-target devices 40 including actuators for actuating a brake for each wheel of the vehicle 110, for adjusting the driver's steering of a steering wheel of the vehicle 110, and for fastening seat belts of the vehicle 110. This aims to avoid collisions of the vehicle 110 with the one or more target objects identified by the target-object identification apparatus 10, or reduce injuries due to the collisions of the vehicle 110 with the one or more target objects identified by the target-object identification apparatus 10.

The drive-assist routine also controls one or more warning devices to visibly and/or audibly output warnings to the driver of the vehicle 110.

Figure 3:
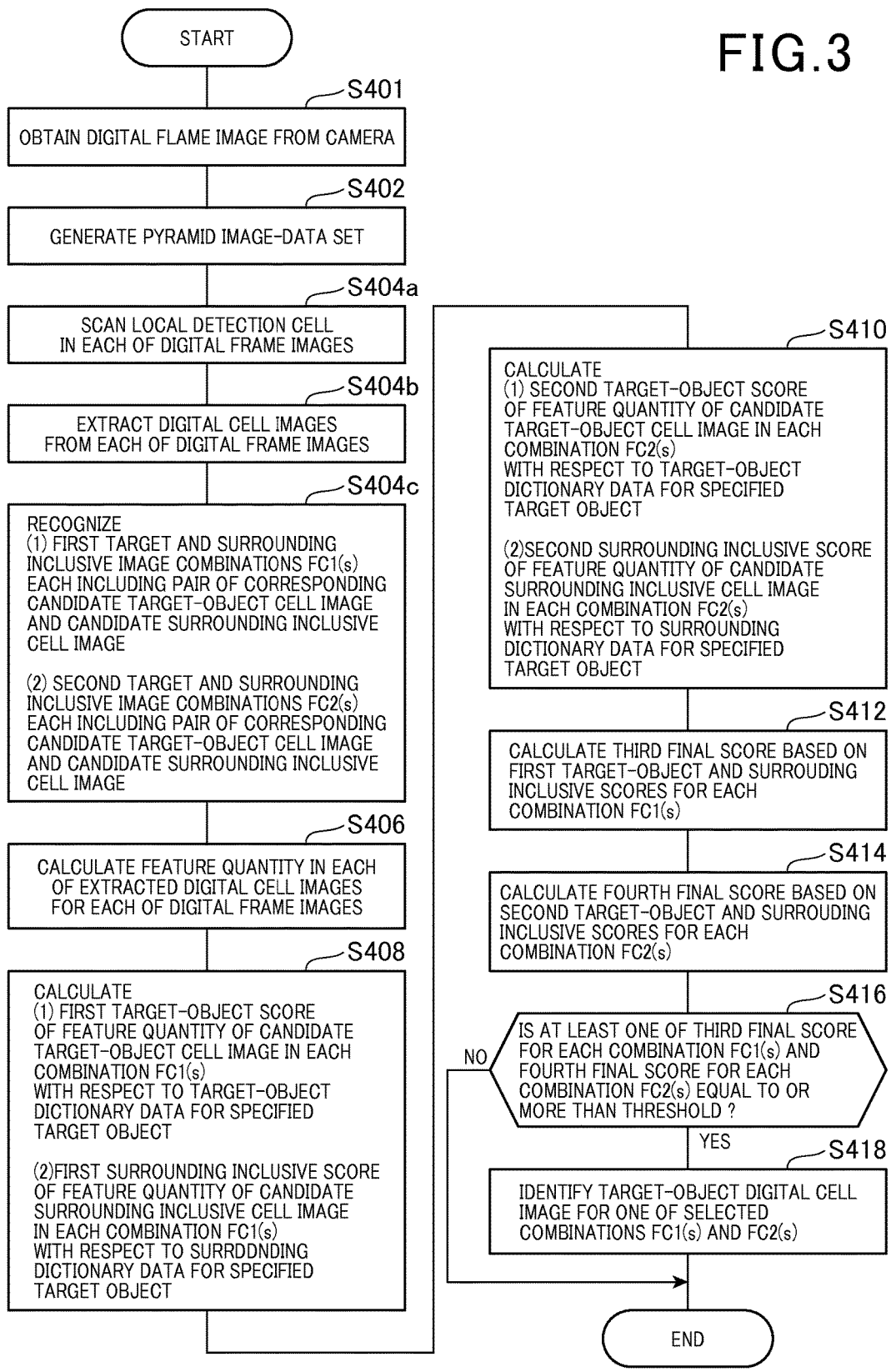
FIG. 3 is a flowchart schematically illustrating a target-object identification routine carried out by a controller of a target-object identification apparatus illustrated in FIG. 1.

Next, the following describes the target-object identification routine cyclically carried out by the controller 12, i.e. its CPU 12a, of the target-object identification apparatus 10 using, for example, the first environmental data obtained by the camera 100 with reference to FIG. 3. That is, the controller 12 carries out the target-object identification routine each time a digital frame image picked up by the camera 100 is input to be controller 12 as the first environmental data.

When starting the target-object identification routine, the controller 12 serves as, for example, a data obtaining unit or step that obtains a digital frame image picked up by the camera 100 as the first environmental data in step S400.

Then, the controller 12 scales the digital frame image, i.e. the original digital frame image, up or down using a predetermined ratio, i.e. a predetermined percentage using one of known scale-up and scale-down methods, thus generating a plurality of digital frame images each having a predetermined percentage with respect to the original digital frame image in step S402. The following also describes the set of scaled-up and/or scaled-down digital frame images generated in step S402 as a pyramid image-data set. The pyramid image-data set can include the original digital frame image.

Note that the number of pixels of each of the scaled-down digital frame images is smaller than the number of pixels of the original digital frame image.

Figure 4:
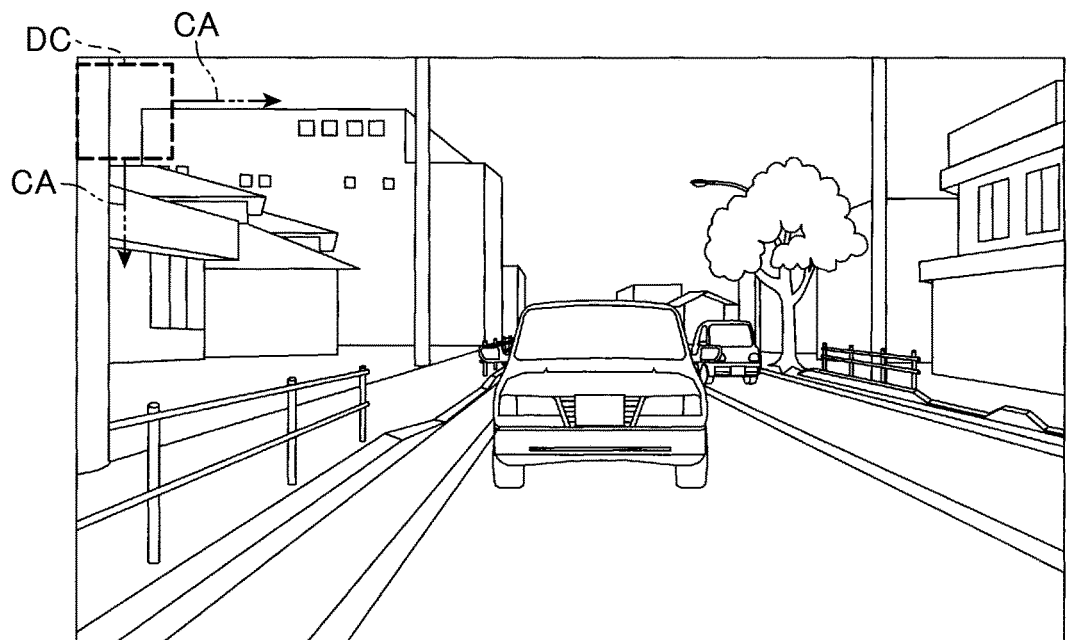
FIG. 4 is a view schematically illustrating a pyramid-image data set including three digital frame images, which have individually predetermined percentages different from each other with respect to an original digital frame image.
Figure 4:
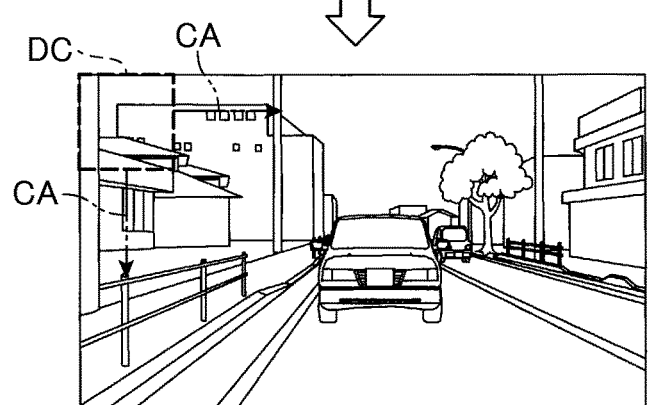
Figure 4:
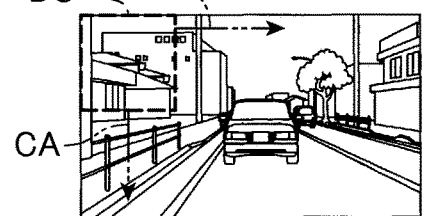

FIG. 4 illustrates three digital frame images 200, 202, and 204, which have individually predetermined percentages different from each other with respect to the original digital frame image, generated as the pyramid image-data set in step S402 according to the first embodiment. The digital frame image 200 is larger in scale than the digital frame image 202, and the digital frame image 202 is larger in scale than the digital frame image 204.

The controller 12 can generate four or more digital frame images having individually predetermined percentages different from each other with respect to the original digital frame image. For example, the controller 12 can generate four or more digital frame images. For example, the four or more digital frame images can include the digital frame images 200, 202, and 204 such that one or more digital frame images is smaller in scale than the smallest digital frame image 204 or one or more digital frame images is larger in scale than the largest digital frame image 200.

If the pyramid image-data set includes the original digital frame image in addition to the other digital frame images, the original digital frame image has the percentage of 100.

The controller 12 of the first embodiment includes the positional relationship between the position of each pixel of the digital frame image 200, the position of a corresponding one of the digital frame image 202, and the position of a corresponding one of the digital frame image 204.

Following the operation in step S402, the controller 12 prepares a predetermined local detection cell DC set forth above having, for example, n×n pixels, such as 3×3 pixels or 5×5 pixels, in matrix. Then, the controller 12 scans the detection cell DC horizontally and vertically from, for example, the top left to the bottom right of each of the digital frame images 200, 202, and 204 while shifting the detection cell DC by, for example, one pixel for the horizontal scanning and shifting the detection cell DC by, for example, one pixel for the vertical scanning in step S404a (see the two-dot chain arrows CA in FIG. 4).

Figure 5:
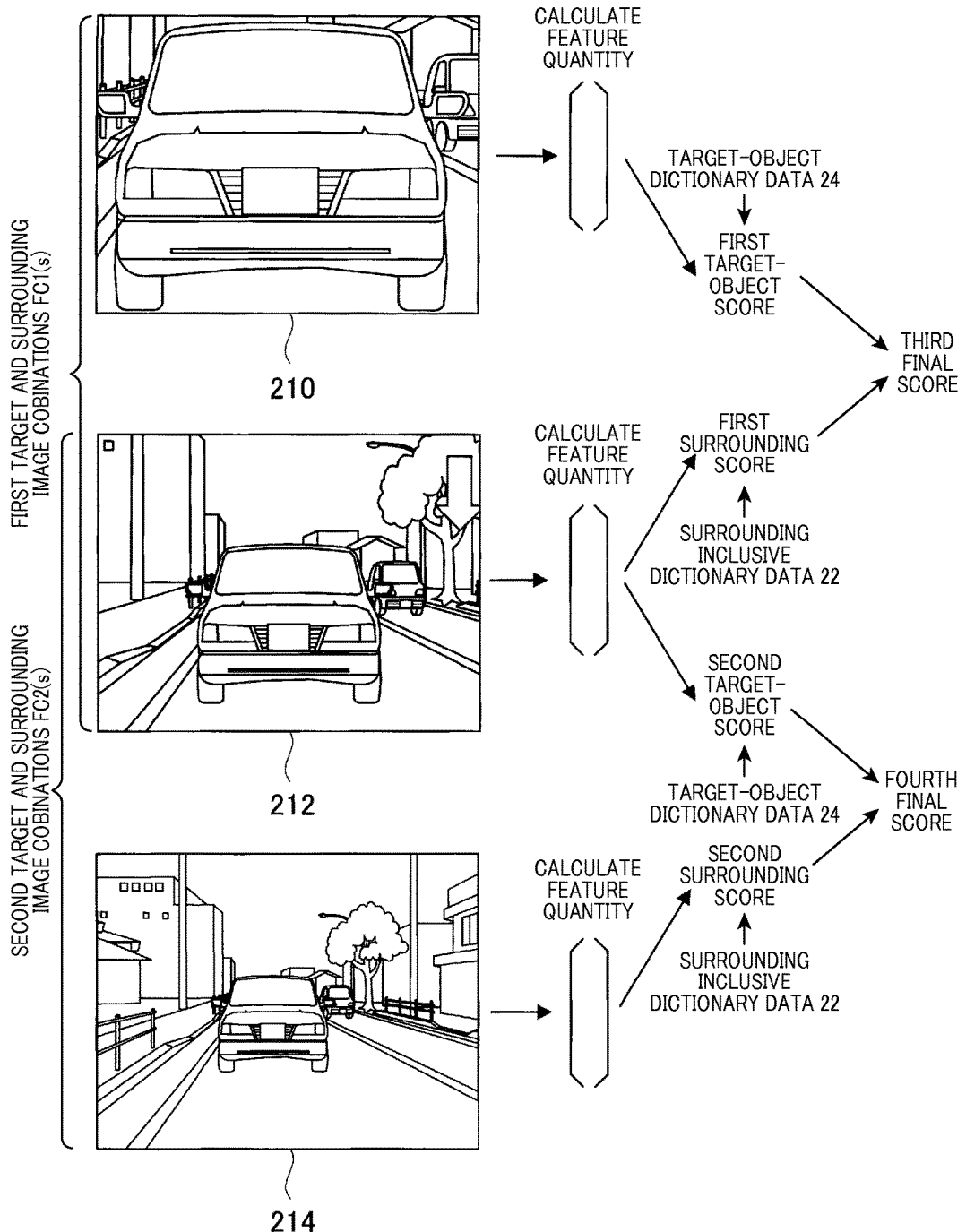
FIG. 5 is a sequence diagram schematically illustrating an example of the specific sequence of operations carried out by the controller during the target-object identification routine.

As illustrated in FIG. 5, in step S404b, the scanning extracts (1) A plurality of digital cell images 210 each having the n×n pixels from the digital frame image 200

(2) A plurality of digital cell images 212 each having the n×n pixels from the digital frame image 202

(3) A plurality of digital cell images 214 each having the n×n pixels from the digital frame image 204.

In step S404b, the controller 12 associates each of the extracted digital cell images 210 with, for example, a corresponding one of the extracted digital cell images 212, and with, for example, a corresponding one of the extracted digital cell images 214 according to the their positional relationships. This enables each of the extracted digital cell images 210 to be associated with a corresponding one of the extracted digital cell images 212, and each of the extracted digital cell images 212 to be associated with a corresponding one of the extracted digital cell images 214.

In step S404c, the controller 12 recognizes that a combination of each of the extracted digital cell images 210 and a corresponding one of the extracted digital cell images 212 associated therewith represents a combination of a candidate target-object cell image 210 and a corresponding candidate surrounding inclusive cell image 212.

That is, in step S404c, the controller 12 recognizes a plurality of first target and surrounding inclusive image combinations FC1(s) each including a pair of a corresponding candidate target-object cell image 210 and a corresponding candidate surrounding inclusive cell image 212 associated therewith; s is an integer more than 1. This is because, in each of the first target and surrounding inclusive image combinations FC1(s), the candidate surrounding inclusive cell image 212 includes the candidate target-object cell image 210 and an environmental situation surrounding the target-object candidate cell image 210 (see FIG. 5).

Similarly, in step S404c, the controller 12 recognizes that a combination of each of the extracted digital cell images 212 and a corresponding one of the extracted digital cell images 214 associated therewith represents a combination of a target-object candidate cell image 212 and a corresponding surrounding inclusive cell image 214.

This is because, in each of the second target and surrounding inclusive image combinations FC2(s), the surrounding inclusive cell image 214 includes the candidate target-object cell image 212 and a situation surrounding the candidate target-object cell image 212 (see FIG. 5).

That is, in step S404c, the controller 12 recognizes a plurality of second target and surrounding inclusive image combinations FC2(s) each including a pair of a corresponding candidate target-object cell image 212 and a corresponding candidate surrounding inclusive cell image 214 associated therewith.

Additionally, note that FIG. 5 illustrates each of an extracted digital cell image 210, and a corresponding extracted digital cell image 212, and a corresponding extracted digital cell image 214 in an enlarged scale as compared with a corresponding actual digital cell image, because of clearly illustration of the extracted digital cell images 210, 212, and 214.

A hardware unit or a software unit for performing the operations in step S404a to S404c serves as, for example, a data extractor or a data extraction step.

Following the operation in step S404c, the controller 12 calculates the feature quantity, i.e. the HOG, in each of the extracted digital cell images 210 in step S406. Similarly, the controller 12 calculates the feature quantity, i.e. the HOG, in each of the extracted digital cell images 212, and the feature quantity, i.e. the HOG, in each of the extracted digital cell images 214 in step S406.

Next, in step S408, the controller 12 calculates (1) The degree of similarity, referred to as a first target-object score, of the feature quantity in the candidate target-object cell image 210 in each of the first target and surrounding inclusive image combinations FC1(s) with respect to a specified target object according to the first identification data prepared for the specified target object in the target-object dictionary data 24

(2) The degree of similarity, referred to as a first surrounding inclusive score, of the feature quantity in the candidate surrounding inclusive cell image 212 in a corresponding one of the first target and surrounding inclusive image combinations FC1(s) with respect to the specified target object according to the first identification data and the second identification data prepared for specified target object in the surrounding dictionary data 22.

Similarly, in step S410, the controller 12 calculates (1) The degree of similarity, referred to as a second target-object score, of the feature quantity in the candidate target-object cell image 212 in each of the second target and surrounding inclusive image combinations FC2(s) with respect to the specified target object according to the first identification data prepared for the specified target object in the target-object dictionary data 24

(2) The degree of similarity, referred to as a second surrounding inclusive score, of the feature quantity in the candidate surrounding inclusive cell image 214 in a corresponding one of the second target and surrounding inclusive image combinations FC2(s) with respect to the specified target object according to the first identification data and the second identification data prepared for the specified target object in the surrounding dictionary data 22.

Note that, for example, the degree of similarity takes a value within the range from 0 to 1 inclusive. The degree of similarity being 1 represents the highest degree of similarity.

Following the operation in step S410, the controller 12 calculates a third final degree of similarity, i.e. a third final score, for each of the first target and surrounding inclusive image combinations FC1(s) according to the calculated first target-object score and surrounding inclusive score for a corresponding one of the first target and surrounding inclusive image combinations FC1(s) in step S412. For example, the controller 12 adds a weighted value of the first target-object score to a weighted value of the surrounding inclusive score for each of the first target and surrounding inclusive image combinations FC1(s), thus calculating the third final degree of similarity, i.e. the third final score, for each of the first target and surrounding inclusive image combinations FC1(s) in step S412.

Similarly, in step S414, the controller 12 calculates a fourth final degree of similarity, i.e. a fourth final score, for each of the second target and surrounding inclusive image combinations FC2(s) according to the calculated second target-object score and surrounding inclusive score for a corresponding one of the second target and surrounding inclusive image combinations FC2(s). For example, the controller 12 adds a weighted value of the second target-object score to a weighted value of the surrounding inclusive score for each of the second target and surrounding inclusive image combinations FC2(s), thus calculating the fourth final degree of similarity, i.e. the fourth final score, for each of the second target and surrounding inclusive image combinations FC2(s) in step S414.

Then, in step S416, the controller 12 determines whether at least one of the third final score for each of the first target and surrounding inclusive image combinations FC1(s) and the fourth final score for each of the second target and surrounding inclusive image combinations FC2(s) is equal to or more than a predetermined threshold.

One or more hardware units or software units for performing the operations in steps S408 to S416 serve as, for example, an identifier or an identification step.

Upon determining that the third final score for selected one of the first target and surrounding inclusive image combinations FC1(s) is equal to or more than the predetermined threshold (YES in step S416), the controller 12 identifies that the target-object candidate cell image 200 for the selected one of the first target and surrounding inclusive image combinations FC1(s) is at least part of the specified target object in step S418.

Similarly, upon determining that the fourth final score for selected one of the second target and surrounding inclusive image combinations FC2(s) is equal to or more than the predetermined threshold (YES in step S416), the controller 12 identifies that the candidate target-object cell image 210 for the selected one of the second target and surrounding inclusive image combinations FC2(s) is at least part of the specified target object in step S418.

Otherwise, upon determining that neither the third final score for each of the first target and surrounding inclusive image combinations FC1(s) nor the fourth final score for each of the second target and surrounding inclusive image combinations FC2(s) is equal to or more than the predetermined threshold (NO in step S416), the controller 12 terminates the target-object identification routine.

The above target-object identification routine specifies one target object to be identified in step S408 as an example. That is, the target-object identification routine specifies a plurality of target objects to be identified in step S408. The controller 12 therefore carries out the operations in steps S408 to S418 for each of the plurality of specified target objects, and determines whether to identify each of the plurality of specified target objects in the picked-up digital frame image as the first environmental data.

At that time, the drive assist apparatus 30

(1) Determines whether the at least one target object identified by the controller 12 of the target-object identification apparatus 10 is approaching the vehicle 110 according to, for example, the first environmental data and/or the second environmental data for the at least one target object (2) Calculates a time to collision (TTC) of the identified at least one target object when it is determined that the identified at least one target object is approaching the vehicle 110

(3) Determine, based on the calculated ITC and the identified at least one target object, at least one of the drive assist routines to be carried out and a threshold time for performing the at least one of the drive assist routines.

The time to collision (FTC) represents the time that would take the vehicle 110 to collide with an identified at least one target object.

That is, the drive assist apparatus 30 performs at least one of the drive assist routines when it is determined that the calculated TTC is reaching the threshold time; the drive assist routine includes (1) Control of the corresponding actuators for actuating the brake for each wheel of the vehicle 110

(2) Control of the corresponding actuators for adjusting the driver's steering of the steering wheel of the vehicle 110

(3) Control of the corresponding actuators for fastening the seat belts of the vehicle 110.

The aforementioned drive assist system 2 according to the first embodiment is configured to calculate the degree of similarity of the feature quantities in a candidate surrounding inclusive cell image 212, which includes a candidate target-object cell image 210 and its surrounding situation, in a picked-up digital frame image with respect to the surrounding dictionary data 22. The surrounding dictionary data 22 includes both the first identification data and the second identification data prepared for each of the target objects. The first identification data is prepared for each of the target objects. The first identification data for each of the target objects is based on the first feature pattern of a corresponding one of the target objects. The second identification data for each of the target objects is based on the second feature pattern around a corresponding one of the target objects.

This configuration enables determination of whether the calculated degree of similarity of the feature quantity in the candidate surrounding inclusive cell image 212 is equal to or more than the predetermined threshold.

Thus, even if the candidate surrounding inclusive cell image 212 includes a part of a non-target object and its surrounding, the configuration achieves the first advantageous effect of reliably excluding the part of the non-target object from a specified target object to be identified. This is because the feature quantity of the candidate surrounding cell image 212 of the non-target object and its surrounding have a lower degree of similarity with respect to the surrounding dictionary data 22 for a specified target object to be identified. This therefore reduces erroneous identification of non-target objects as target objects, thus improving the accuracy of identifying target objects.

For example, let us assume that the feature quantity, i.e. HOG, in a candidate target-object cell image 210 for a preceding vehicle as a specified target object is similar to the feature quantity in the candidate target-object cell image 210 for a pedestrian. In this assumption, because the feature quantity in a candidate surrounding inclusive cell image 212, which includes the candidate target-object cell image 210, for the preceding vehicle likely differs from the feature quantity in the candidate surrounding inclusive cell image 212 for the pedestrian, it is reliably identify that the preceding vehicle is not in the candidate target-object cell image 210.

In particular, the aforementioned drive assist system 2 according to the first embodiment is configured to calculate both (1) The first degree of similarity of the feature quantities in a candidate target-object cell image 210 in a picked-up digital frame image with respect to a specified target object according to the first identification data prepared for the specified target object in the target-object dictionary data 24

(2) The second degree of similarity of the feature quantities in a candidate surrounding inclusive cell image 212 which includes the target-object candidate cell image 210 and its surrounding situation, in the picked-up digital frame image with respect to the specified target object according to the first identification data and the second identification data prepared for the specified target object in the surrounding dictionary data 22.

This configuration determines whether the target-object candidate cell image 210 is at least a part of the specified target object according to both the first degree of the feature quantities in the candidate target-object cell image 210 and the second degree of similarity of the feature quantities in a candidate surrounding inclusive cell image 212.

This configuration makes it possible to determine that the candidate target-object cell image 210 is not a part of the specified target object to be identified if, for example, (1) One of the first degree of similarity of the feature quantities in the candidate target-object cell image 210 and the second degree of similarity of the feature quantities in a candidate surrounding inclusive cell image 212 is more than the threshold (2) The other of the first degree of similarity of the feature quantities in the candidate target-object cell image 210 and the second degree of similarity of the feature quantities in a candidate surrounding inclusive cell image 212 is less than the threshold.

(3) The total degree of similarity calculated based on both the first degree of similarity and the second degree of similarity is less than the threshold.

Additionally, the aforementioned drive assist system 2 according to the first embodiment is configured to extract (1) A plurality of digital cell images 210 each having a predetermined pixel size from the digital frame image 200

(2) A plurality of digital cell images 212 each having the same pixel size from the digital frame image 202

(3) A plurality of digital cell images 214 each having the same pixel size from the digital frame image 204.

That is the pixel size of each of the extracted digital cell images 210 is identical to that of each of the extracted digital cell images 212 and to that of each of the extracted digital cell images 214.

In particular, the controller 12 recognizes (1) The first target and surrounding inclusive image combinations FC1(s) each including a pair of a corresponding candidate target-object cell image 210 and a corresponding candidate surrounding inclusive cell image 212 associated therewith (2) The second target and surrounding inclusive image combinations FC2(s) each including a pair of a corresponding candidate target-object cell image 212 and a corresponding surrounding inclusive cell image 214 associated therewith.

In other words, the controller 12 uses a corresponding candidate surrounding inclusive cell image 212 included in each of the first target and surrounding inclusive image combinations FC1(s), and also uses the corresponding candidate surrounding inclusive cell image 212 as a corresponding candidate target-object cell image 212 in each of the second target and surrounding inclusive image combinations FS2(s).

This configuration therefore enables the feature quantities of the corresponding candidate surrounding inclusive cell image 212 included in each of the first target and surrounding inclusive image combinations FC1(s) to be used as the feature quantities of the candidate target-object cell image 212 in each of the second target and surrounding inclusive image combinations FC2(s).

This therefore achieves the third advantageous effect of reducing the calculation load of the feature quantities of the candidate target-object cell image 212 in each of the second target and surrounding inclusive image combinations FC2(s).

Second Embodiment

Figure 6:
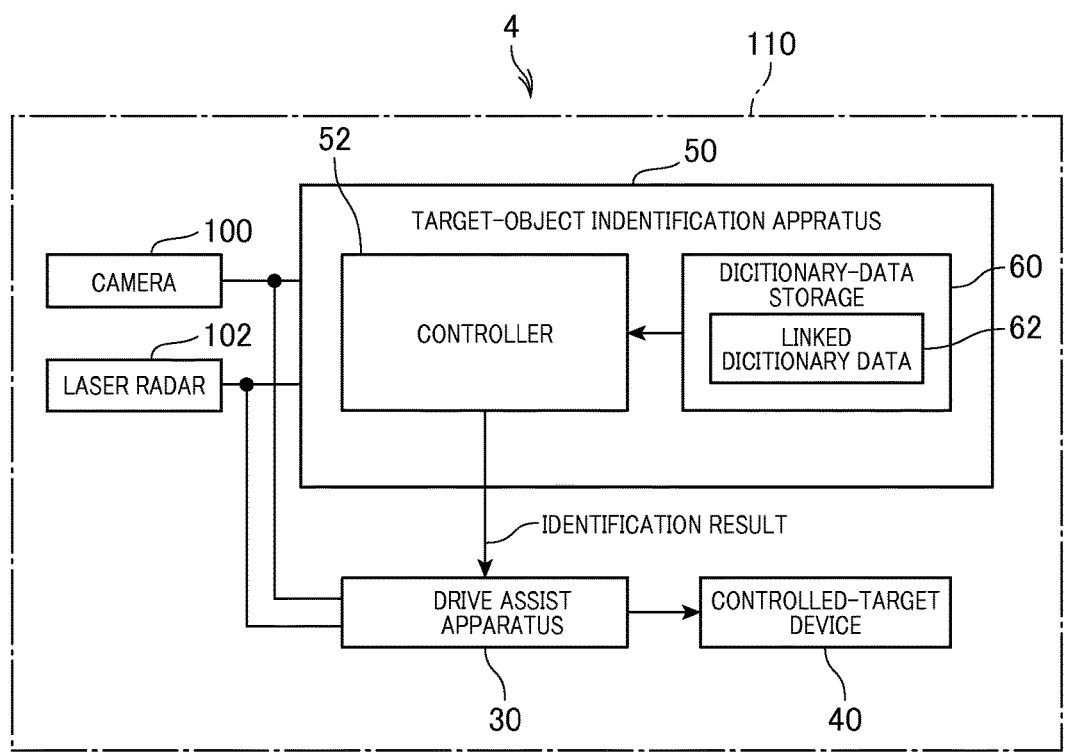
FIG. 6 is a block diagram schematically illustrating an example of the overall structure of a drive assist system installed in a vehicle according to the second embodiment of the present disclosure.
Figure 7:
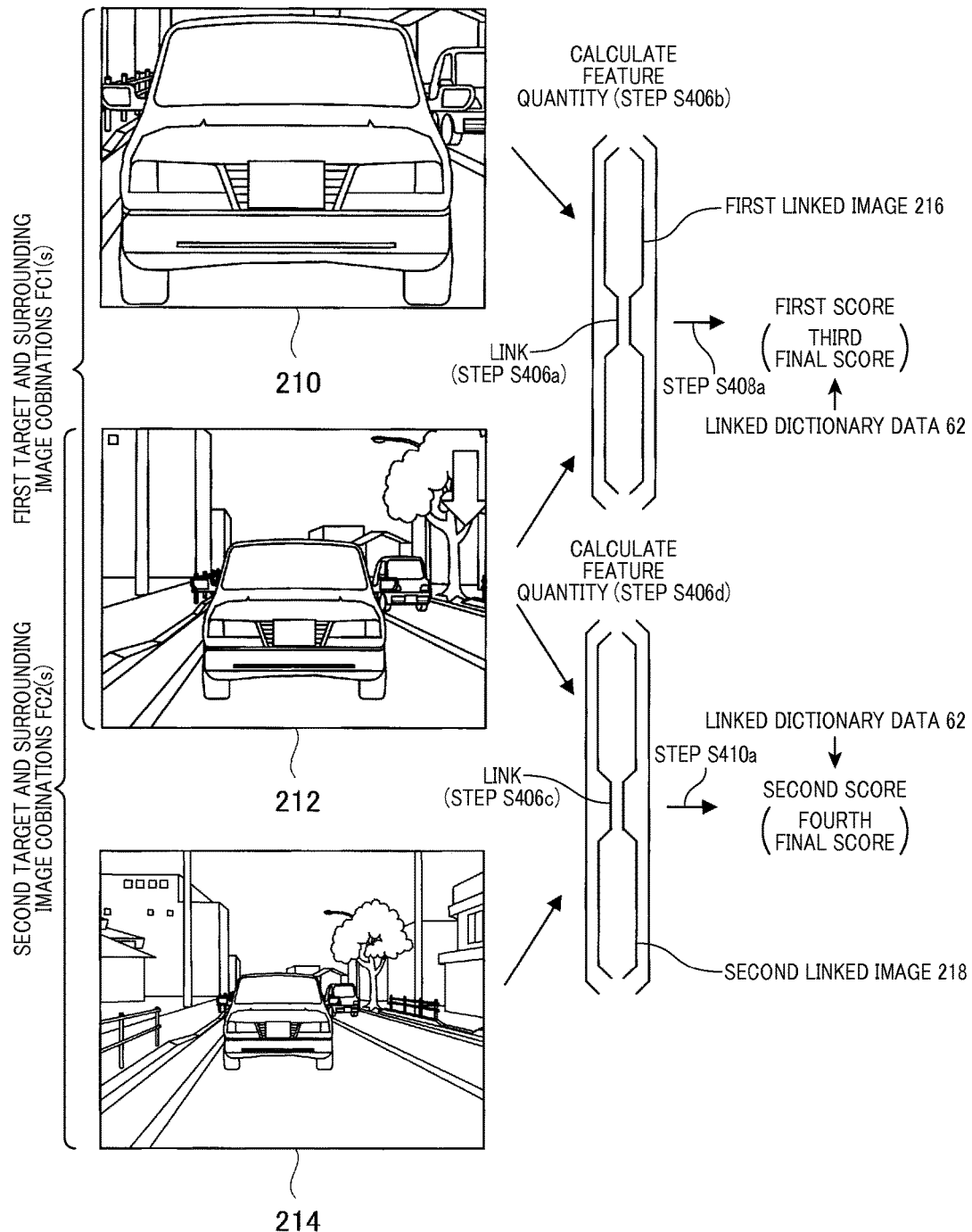
FIG. 7 is a sequence diagram schematically illustrating an example of the specific sequence of operations carried out by the controller illustrated in FIG. 6 during a target-object identification routine according to the second embodiment.

The following describes a drive assist system 4 according to the second embodiment of the present disclosure with reference to FIGS. 6 and 7.

The structure and functions of the drive assist system 4 are slightly different from those of the drive assist system 2 by the following points. So, the following describes mainly the different points.

Referring to FIG. 6, the drive assist system 4 includes a target-object identification apparatus 50 in addition to the drive assist apparatus 30, the camera 100, and the beam sensor 102.

The target-object identification apparatus 50 includes a controller 52 and a dictionary-data storage 60. The dictionary-data storage 60 includes, for example, a ROM or a database, and stores, as linked dictionary data 62 including the surrounding dictionary data 22 and the target-object dictionary data 24 linked to the surrounding dictionary data 22.

Specifically, the controller 52, which can perform the operations in steps S401, S402, S403, and S404*a* to 404*c*, links each of the extracted digital cell images 210 to a corresponding one of the extracted digital cell images 212, thus generating first linked images 216 in step S406*a* (see FIG. 7).

Then, the controller 52 calculates the feature quantities, i.e. the HOG, in each of the first linked images 216 in step S406*b* (see FIG. 7).

Similarly, the controller 52 links each of the extracted digital cell images 212 to a corresponding one of the extracted digital cell images 214, thus generating second linked images 218 in step S406*c* (see FIG. 7).

Then, the controller 52 calculates the feature quantities, i.e. the HOG, in each of the second linked images 218 in step S406d (see FIG. 7).

Following the operations in step S406d, in step S408a of FIG. 7, the controller 52 calculates the degree of similarity, referred to as a first score, of the feature quantities in each of the first linked images 216 with respect to the linked dictionary data 62.

Similarly, in step S410a of FIG. 7, the controller 52 calculates the degree of similarity, referred to as a second score, of the feature quantities in each of the second linked images 218 with respect to the linked dictionary data 62.

The first score according to the second embodiment matches with the third final score according to the first embodiment, and the second score according to the second embodiment matches with the fourth final score according to the first embodiment.

Following the operation in step S410a, the controller 52 performs the same operations as the operations in steps S412 to S418.

The above drive assist system 4 according to the second embodiment differs in structure from the drive assist system 2 in merely that (1) The drive assist system 4 uses the linked dictionary data 62 including the surrounding dictionary data 22 and the target-object dictionary data 24 linked to the surrounding dictionary data 22

(2) Links each of the extracted digital cell images 210 to a corresponding one of the extracted digital cell images 212, thus generating first linked images 216

(3) Links each of the extracted digital cell images 212 to a corresponding one of the extracted digital cell images 214, thus generating second linked images 218

(4) Calculates the feature quantities in each of the first linked images 216 in step S406b, and calculates the feature quantities in each of the second linked images 218.

Thus, the drive assist system 4 according to the second embodiment achieves the same first and second advantageous effects as the drive assist system 2 does.

Third Embodiment

Figure 8:
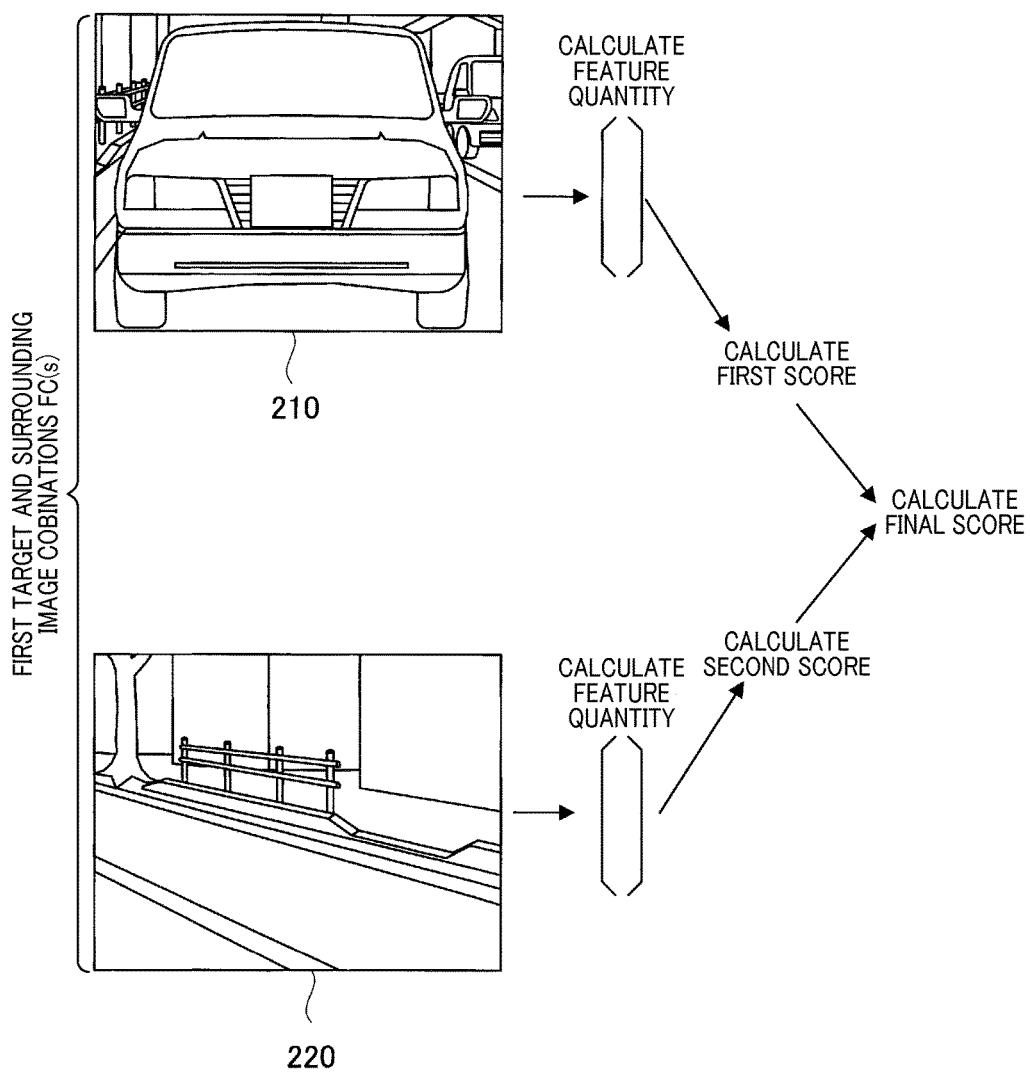
FIG. 8 is a sequence diagram schematically illustrating an example of the specific sequence of operations carried out by a controller according to the third embodiment of the present disclosure during a target-object identification routine according to the third embodiment.

The following describes a drive assist system according to the third embodiment of the present disclosure with reference to FIG. 8.

The structure and functions of the drive assist system are slightly different from those of the drive assist system 2 by the following points. So, the following describes mainly the different points.

The surrounding dictionary data 22 according to the first embodiment includes, in addition to the first identification data, the second identification data for each of the target objects, which is based on the estimated environmental feature quantity pattern around a corresponding one of the target objects.

In contrast, the surrounding dictionary data 22 according to the third embodiment includes, in addition to the first identification data, the second identification data for each of the target objects, which is based on the estimated environmental feature quantity pattern of a predetermined location separately close to a corresponding one of the target objects.

In addition, the controller 12 extracts, from a picked-up digital frame image, a plurality of candidate target-object cell images 210 and a plurality of candidate surrounding inclusive cell image 212 each including and surrounding a corresponding one of the target-object candidate cell images 210 in step S404c according to the first embodiment.

In contrast, the controller 12 extracts, from a picked-up digital frame image, a plurality of candidate target-object cell images 210 and a plurality of candidate surrounding cell images 220 each being located separately close to a corresponding one of the candidate target-object cell images 210 in step S404c according to the third embodiment.

For example, as illustrated in FIG. 8, when extracting, from a picked-up digital frame image, a candidate target-object cell image 210, the controller 12 extracts, from the picked-up digital frame image, a candidate surrounding cell image 220 located separately on the right side of the candidate target-object cell image 210 in front of the camera 100, i.e. the vehicle 110.

Specifically, the controller 12 recognizes that a combination of each of the extracted digital cell images 210 and a corresponding one of the extracted digital cell images 212 associated therewith represents a combination of a candidate target-object cell image 210 and a corresponding candidate surrounding cell image 220 in an operation similar to the operation in step S404c.

That is, in an operation similar to the operation in step S404c, the controller 12 recognizes that a plurality of target and surrounding image combinations FC(s) each including a pair of a corresponding candidate target-object cell image 210 and a corresponding candidate surrounding cell image 220 associated therewith; s is an integer more than 1.

Next, the controller 12 calculates the feature quantities, i.e. the HOG, in each of the extracted digital cell images 210 in step S406. Similarly, the controller 12 calculates the feature quantities, i.e. the HOG, in each of the extracted digital cell images 220 in an operation similar to the operation in step S406.

Subsequently, the controller 12 calculates (1) The degree of similarity, referred to as a target-object score, of the feature quantities in the candidate target-object cell image 210 in each of the target and surrounding image combinations FC(s) with respect to a specified target object according to the first identification data prepared for the specified target object in the target-object dictionary data 24

(2) The degree of similarity, referred to as a surrounding score, of the feature quantities in the candidate surrounding cell image 220 in a corresponding one of the target and surrounding image combinations FC(s) with respect to the specified target object according to the first identification data and the second identification data prepared for the specified target object in the surrounding dictionary data 22 in an operation similar to the operation in step S408.

Next, the controller 12 calculates a final degree of similarity, i.e. a final score, for each of the target and surrounding image combinations FC(s) according to the calculated first target-object score and surrounding score for a corresponding one of the target and surrounding image combinations FC(s) in an operation similar to the operation in step S412. Then, the controller 12 determines whether the final score for each of the target and surrounding image combinations FC(s) is equal to or more than the predetermined threshold.

Upon determining that the final score for selected one of the target and surrounding image combinations FC(s) is equal to or more than the predetermined threshold, the controller 12 identifies that the candidate target-object cell image 200 for the selected one of the target and surrounding image combinations FC(s) is at least part of the specified target object in an operation similar to the operation step S418.

Note that the controller 12 can extract, from a picked-up digital frame image, a plurality of candidate target-object cell images 210 and a plurality of candidate surrounding cell images 220 each being located adjacent to or partially overlapped to a corresponding one of the candidate target-object cell images 210.

The surrounding dictionary data 22 and the target-object dictionary data 24 according to the third embodiment can be designed to be independent from each other, or can be linked to each other like the second embodiment.

The aforementioned drive assist system according to the third embodiment is configured to calculate both (1) The degree of similarity of the feature quantities in a candidate target-object cell image 210 in a picked-up digital frame image with respect to the specified target object according to the first identification data for the specified target object in the target-object dictionary data 24

(2) The degree of similarity of the feature quantities in a candidate surrounding cell image 220 which is located separately from the candidate target-object cell image 210, in the picked-up digital frame image with respect to the specified target object according to the first identification data and the second identification data for the specified target object in the surrounding dictionary data 22.

This configuration determines whether the candidate target-object cell image 210 is at least a part of a target object to be identified according to both the degree of the feature quantities in the candidate target-object cell image 210 and the degree of similarity of the feature quantities in a candidate surrounding cell image 220. This configuration therefore achieves the above second advantageous effect of more improving the accuracy of identifying target objects.

The present disclosure is not limited to the descriptions of each of the first to third embodiments, and the descriptions of each of the first to third embodiments can be widely modified within the scope of the present disclosure.

The drive assist system according to each of the first to third embodiments uses the surrounding dictionary data 22 and the target-object dictionary data 24 individually, or use the linked dictionary data 62 including the surrounding dictionary data 22 and the target-object dictionary data 24 linked to the surrounding dictionary data 22 to thereby perform the target-object identification routine. The present disclosure can use merely the surrounding dictionary data 22 to thereby perform the target-object identification routine.

The digital cell image 210 extracted by the controller 12, which is to be compared with the target-object dictionary data 24, according to the first embodiment can differ in size, i.e. in pixel size, from the digital cell image 212 extracted by the controller 12, which is to be compared with the surrounding dictionary data 22.

Similarly, the digital cell image 210 extracted by the controller 12, which is to be compared with the linked dictionary data 62, according to the second embodiment can differ in size, i.e. in pixel size, from the digital cell image 212 extracted by the controller 12, which is to be compared with the linked dictionary data 62.

The drive assist system according to each of the first to third embodiments obtains a frame image picked-up by the camera 100 as a piece of the first environmental data around the vehicle 110, and performs the target-object identification routine according to the piece of the first environmental data around the vehicle 110. The present disclosure is however not limited to the configuration.

Specifically, the present disclosure can obtain the detected distances and orientations of objects around the vehicle 110 as pieces of the second environmental data around the vehicle 110, and perform the target-object identification routine according to the pieces of the second environmental data around the vehicle 110.

In other words, the distances and orientations detected by the laser radar 102 serve as, for example, features of objects around the vehicle 110.

The present disclosure discloses an inventive concept as an apparatus for identifying a target object installed in a motor vehicle, but the present disclosure can include at least part of the target-object identification routine, i.e. the set of corresponding instructions of a computer program, as one aspect of the inventive concept. Similarly, the present disclosure can include a method based on at least part of the target-object identification routine as another aspect of the inventive concept.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for identifying a target object, the apparatus comprising:
    a controller;
    a data obtaining unit that obtains environmental data indicative of features of an environmental situation of a vehicle;
    a data extractor that extracts, from the environmental data, candidate data which may include a specified target object and an environmental situation of the specified target object,
    the candidate data including a feature in the features of the environmental situation;
    a storage that stores therein:
        first identification data prepared for each of a plurality of target objects including the specified target object, the first identification data for each of the plurality of target objects being determined based on a first feature pattern of a corresponding one of the target objects; and
        second identification data prepared for each of the plurality of target objects, the second identification data for each of the plurality of target objects being determined based on a second feature pattern indicative of a surrounding environment around a corresponding one of the plurality of target objects; and
    an identifier that:
        obtains a degree of similarity of the feature of the candidate data with respect to the specified target object according to the first identification data and the second identification data prepared for the specified target object; and
        identifies, according to the obtained degree of similarity, whether the specified target object is in the environmental data,
    wherein the controller controls, based on a result of identification of whether the specified target object is in the environmental data, at least one target device installed in the vehicle to perform a drive assist task for the vehicle.

2. The apparatus according to claim 1, wherein:
    the data extractor is configured to extract, from the environmental data, candidate situation data, which is the candidate data, and candidate target-object data estimated as the specified target object,
the candidate target-object data including a first feature in the features of the environmental situation,
the candidate situation data including a second feature in the features of the environmental data;
the storage comprises:
   a first data assembly that includes the first identification data prepared for each of the plurality of target objects, and
   a second data assembly that includes the second identification data prepared for each of the plurality of target objects; and
the identifier is configured to:
   obtain:
      a first degree of similarity of the first feature of the candidate target-object data with respect to the specified target object according to the first identification data prepared for the specified target object in the first data assembly, and
      a second degree of similarity of the second feature of the candidate situation data with respect to the specified target object according to the second identification data prepared for the specified target object in the second data assembly, and
   identify, according to the obtained first degree of similarity and the obtained second degree of similarity, whether the specified target is in the environmental data.

3. The apparatus according to claim 2, wherein:
the data extractor is configured to extract, from the environmental data, linked candidate data including the candidate situation data and the target-object candidate data linked to the candidate situation data;
the storage is configured such that the first data assembly is linked to the second data assembly; and
the identifier is configured to:
   obtain, as the first degree of similarity and the second degree of similarity, third degrees of similarity of the first and second features of the linked candidate data with respect to the specified target object according to the first identification data and the second identification data prepared for the specified target object in the first and second data assemblies linked to each other; and
   identify, according to the obtained third degrees of similarity, whether the specified target object is in the environmental data.

4. The apparatus according to claim 3, wherein:
the storage is configured such that the first identification data prepared for each of the plurality of target objects is linked to the second identification data of the surrounding environment around a corresponding one of the plurality of target objects.

5. The apparatus according to claim 2, wherein:
the storage is configured to store the first data assembly and the second data assembly such that the first data assembly is separated from the second data assembly.

6. The apparatus according to claim 2, wherein the environmental data has a predetermined size, the apparatus further comprising:
a data generator that scales the environmental data, which is original environmental data, up or down to generate a plurality of pieces of environmental data, the plurality of pieces of environmental data having predetermined different percentages of the original environmental data,
the data extractor is configured to extract the candidate situation data from a first piece of environmental data in the pieces of environmental data, and extract the candidate target-object data from a second piece of environmental data in the pieces of the environmental data,
the first piece of environmental data being smaller in size from the second piece of environmental data.

7. The apparatus according to claim 2, wherein the environmental data has a predetermined size, the apparatus further comprising:
a data generator that scales the environmental data, which is original environmental data, up or down to generate first, second, and third pieces of environmental data, the first, second and third pieces of environmental data individually having predetermined different percentages with respect to the original environmental data, the second piece of environmental data being smaller in size from the first piece of environmental data, and larger in size from the third piece of environmental data,
wherein:
the data extractor is configured to extract:
   first local data from the first piece of environmental data;
   second local data from the second piece of environmental data; and
   third local data from the third piece of environmental data,
the first local data, second local data, and third local data having a same size with each other; and
the identifier is configured to perform one of:
a first task that:
   uses the first local data as the candidate target-object data to obtain the first degree of similarity of the first feature of the candidate target-object data with respect to the specified target object according to the first identification data prepared for the specified target object in the first data assembly; and
   uses the second local data as the candidate situation data to obtain the second degree of similarity of the second feature of the candidate situation data with respect to the specified target object according to the second identification data prepared for the specified target object in the second data assembly; and
a second task that:
   uses the second local data as the candidate target-object data to obtain the first degree of similarity of the first feature of the candidate target-object data with respect to the specified target object according to the first identification data prepared for the specified target object in the first data assembly; and
   uses the third local data as the candidate situation data to obtain the second degree of similarity of the second feature of the candidate situation data with respect to the specified target object according to the second identification data prepared for the specified target object in the second data assembly.

8. An apparatus for identifying a target object, the apparatus comprising:
a controller;
a data obtaining unit that obtains environmental data indicative of features of an environmental situation of a vehicle;
a data extractor that extracts, from the environmental data, candidate situation data which may include a specified target object and an environmental situation of the specified target object, and candidate target-object data estimated as the specified target object, the candidate target-object data including a first feature in the features of the environmental situation, the candidate situation data including a second feature in the features of the environmental situation;

a storage that stores therein:

first identification data prepared for each of a plurality of target objects including the specified target object, the first identification data for each of the plurality of target objects being determined based on a first feature pattern of a corresponding one of the target objects; and second identification data prepared for each of the plurality of target objects, the second identification data for each of the plurality of target objects being determined based on a second feature pattern indicative of a surrounding environment around a corresponding one of the plurality of target objects; and an identifier that:

obtains a first degree of similarity of the first feature of the candidate target-object data with respect to the specified target object according to the first identification data prepared for the specified target object, obtains a second degree of similarity of the second feature of the candidate situation data with respect to the specified target object according to the second identification data prepared for the specified target object, and identifies, according to the obtained first degree of similarity and second degree of similarity, whether the specified target object is in the environmental data, wherein the controller controls, based on a result of identification of whether the specified target object is in the environmental data, at least one target device installed in the vehicle to perform a drive assist task for the vehicle.

9. The apparatus according to claim 8, wherein the environmental data has a predetermined size, the apparatus further comprising:

a data generator that scales the environmental data, which is original environmental data, up or down to generate a plurality of pieces of environmental data, the plurality of pieces of environmental data having predetermined different percentages with respect to the original environmental data, the data extractor is configured to extract the candidate situation data from a first piece of environmental data in the pieces of environmental data, and extract the candidate target-object data from a second piece of environmental data in the pieces of the environmental data, the first piece of environmental data being smaller in size from the second piece of environmental data.

10. The apparatus according to claim 8, wherein the environmental data has a predetermined size, the apparatus further comprising:

a data generator that scales the environmental data, which is original environmental data, up or down to generate first, second, and third pieces of environmental data, the first, second and third pieces of environmental data individually having predetermined different percentages with respect to the original environmental data, the second piece of environmental data being smaller in size from the first piece of environmental data, and larger in size from the third piece of environmental data, wherein:

the data extractor is configured to extract:

first local data from the first piece of environmental data;

second local data from the second piece of environmental data; and third local data from the third piece of environmental data, the first local data, second local data, and third local data having a same size with each other; and the identifier is configured to perform one of:

a first task that:

uses the first local data as the candidate target-object data to obtain the first degree of similarity of the first feature of the candidate target-object data with respect to the specified target object according to the first identification data prepared for the specified target object; and uses the second local data as the candidate situation data to obtain the second degree of similarity of the second feature of the candidate situation data with respect to the specified target object according to the second identification data prepared for the specified target object; and a second task that:

uses the second local data as the candidate target-object data to obtain the first degree of similarity of the first feature of the candidate target-object data with respect to the specified target object according to the first identification data prepared for the specified target object; and uses the third local data as the candidate situation data to obtain the second degree of similarity of the second feature of the candidate situation data with respect to the specified target object according to the second identification data prepared for the specified target object.

11. An apparatus for identifying a target object, the apparatus comprising:

a controller;

a data obtaining unit that obtains environmental data indicative of features of an environmental situation of a vehicle;

a data extractor that extracts, from the environmental data, candidate target-object data estimated as a specified target object, and candidate situation data having a predetermined location in the environmental data separated from the specified target object, the candidate target-object data including a first feature in the features of the environmental situation, the candidate situation data including a second feature in the features of the environmental situation;

a storage that stores therein:

first identification data prepared for each of a plurality of target objects including the specified target object, the first identification data for each of the plurality of target objects being determined based on a first feature pattern of a corresponding one of the target objects; and second identification data prepared for each of the plurality of target objects, the second identification data for each of the plurality of target objects being determined based on a second feature pattern of at least the predetermined location of the candidate situation data; and an identifier that:
  obtains a first degree of similarity of the first feature of the candidate target-object data with respect to the specified target object according to the first identification data prepared for the specified target object,
  obtains a second degree of similarity of the second feature of the candidate situation data with respect to the specified target object according to the second identification data prepared for the specified target object, and
  identifies, according to the obtained first degree of similarity and second degree of similarity, whether the specified target object is in the environmental data,
  wherein the controller controls, based on a result of identification of whether the specified target object is in the environmental data, at least one target device installed in the vehicle to perform a drive assist task for the vehicle.

12. The apparatus according to claim 11, wherein:
the data extractor is configured to extract, from the environmental data, linked candidate data including the candidate situation data and the target-object candidate data linked to the candidate situation data; and
the identifier is configured to:
  obtain, as the first degree of similarity and the second degree of similarity, third degrees of similarity of the first and second features of the linked candidate data with respect to the specified target object according to the first identification data and the second identification data prepared for the specified target object; and
  identify, according to the obtained third degrees of similarity, whether the specified target object is in the environmental data.

13. The apparatus according to claim 11, wherein:
the storage is configured such that the first identification data prepared for each of the plurality of target objects is linked to the second identification data prepared for a corresponding one of the plurality of target objects.

14. A drive assist system comprising:
an apparatus selected from one of the apparatus according to claim 1, the apparatus according to claim 8, and the apparatus according to claim 11; and
a drive assist apparatus that performs one of a first drive assist task and a second drive assist task upon the specified target object being identified in the environmental data,
the first drive assist task being configured to avoid a collision of the vehicle with the specified target object,
the second drive assist task being configured to attempt to reduce injuries of occupants of the vehicle due to the collision of the vehicle with the identified specified target object.

15. A vehicle comprising:
an apparatus selected from one of the apparatus according to claim 1, the apparatus according to claim 8, and the apparatus according to claim 11;
at least one target device installed in the vehicle; and
a drive assist apparatus that performs one of a first drive assist task and a second drive assist task upon the specified target object being identified in the environmental data,
the first drive assist task being configured to cause the at least one target device to avoid a collision of the vehicle with the identified specified target object,
the second drive assist task being configured to cause the at least one target device to attempt to reduce injuries of occupants of the vehicle due to the collision of the vehicle with the identified specified target object.

16. A method of identifying a target object, the method comprising:
obtaining environmental data indicative of features of an environmental situation of a vehicle;
extracting, from the environmental data, candidate data which may include a specified target object and an environmental situation of the specified target object, the candidate data including a feature in the features of the environmental situation;
preparing:
  first identification data for each of a plurality of target objects including the specified target object, the first identification data for each of the plurality of target objects being determined based on a first feature pattern of a corresponding one of the target objects; and
  second identification data for each of the plurality of target objects, the second identification data for each of the plurality of target objects being determined based on a second feature pattern indicative of a surrounding environment around a corresponding one of the plurality of target objects;
obtaining a degree of similarity of the feature of the candidate data with respect to the specified target object according to the first identification data and the second identification data prepared for the specified target object;
identifying, according to the obtained degree of similarity, whether the specified target object is in the environmental data; and
controlling, based on whether the specified target object is in the environmental data, at least one target device installed in the vehicle to perform a drive assist task for the vehicle.

17. A method of identifying a target object, the method comprising:
obtaining environmental data indicative of features of an environmental situation of a vehicle;
extracting, from the environmental data, candidate situation data which may include a specified target object and an environmental situation of the specified target object, and candidate target-object data estimated as the specified target object,
the candidate target-object data including a first feature in the features of the environmental situation,
the candidate situation data including a second feature in the features of the environmental situation;
preparing:
  the first identification data for each of a plurality of target objects including the specified target object, the first identification data for each of the plurality of target objects being determined based on a first feature pattern of a corresponding one of the target objects; and
  the second identification data for each of the plurality of target objects, the second identification data for each of the plurality of target objects being determined based on a second feature pattern indicative of a surrounding environment around a corresponding one of the plurality of target objects;
obtaining a first degree of similarity of the first feature of the candidate target-object data with respect to the specified target object according to the first identification data for the specified target object;
obtaining a second degree of similarity of the second feature of the candidate situation data with respect to the specified target object according to the second identification data prepared for the specified target object;
identifying, according to the obtained first degree of similarity and second degree of similarity, whether the specified target object is in the environmental data; and
controlling, based on whether the specified target object is in the environmental data, at least one target device installed in the vehicle to perform a drive assist task for the vehicle.

18. A method of identifying a target object, the method comprising:
obtaining environmental data indicative of features of an environmental situation of a vehicle;
extracting, from the environmental data, candidate target-object data estimated as a specified target object, and candidate situation data having a predetermined location in the environmental data separated from the specified target object,
the candidate target-object data including a first feature in the features of the environmental situation,
the candidate situation data including a second feature in the features of the environmental situation;
preparing:
first identification data for each of a plurality of target objects including the specified target object, the first identification data for each of the plurality of target objects being determined based on a first feature pattern of a corresponding one of the target objects; and
second identification data for each of the plurality of target objects, the second identification data for each of the plurality of target objects being determined based on a second feature pattern of at least the predetermined location of the candidate situation data;
obtaining a first degree of similarity of the first feature of the candidate target-object data with respect to the specified target object according to the first identification data prepared for the specified target object;
obtaining a second degree of similarity of the second feature of the candidate situation data with respect to the specified target object according to the second identification data prepared for the specified target object;
identifying, according to the obtained first degree of similarity and second degree of similarity, whether the specified target object is in the environmental data; and
controlling, based on whether the specified target object is in the environmental data, at least one target device installed in the vehicle to perform a drive assist task for the vehicle.

* * * * *